Patented Dec. 26, 1950

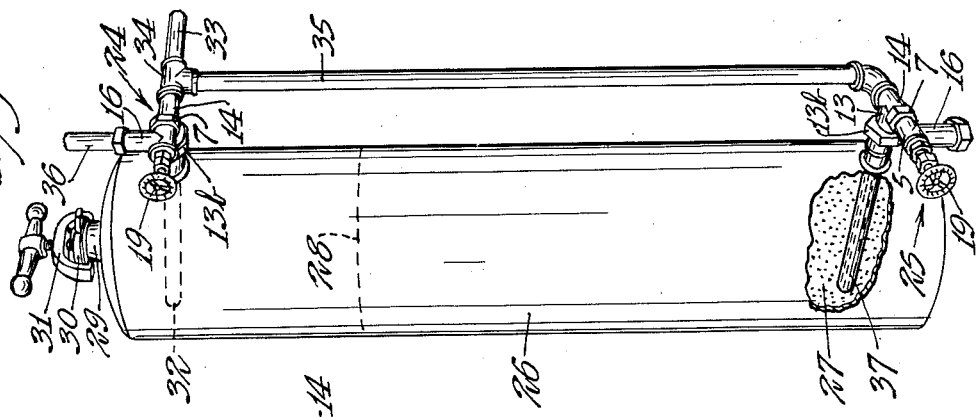

2,535,432

UNITED STATES PATENT OFFICE 2,535,432

CONTROL FOR WATER SOFTENING APPARATUS

Lynn G. Lindsay, St. Paul, Minn.

Application June 28, 1946, Serial No. 680,311

2 Claims. (Cl. 210—24)

This invention relates to simple, low cost controls for water softening apparatus of the type containing zeolites requiring periodic regeneration and particularly to an improved valve mechanism for controlling the softening and regenerating operations.

An object of the invention is to provide an improved control for apparatus of the class described consisting of a pair of two-way, three-port valves located near the top and bottom respectively of a tank containing water softening material, the valves having ports severally communicating with the tank, a hard water supply inlet and drain and soft water outlet conduits.

A further object is to provide an improved three-port, two-way valve adapted for use in controlling water softeners of the class described.

A particular object is to provide a valve of the class described with a plurality of casing parts severally formed with branches defining port passages and connected together to permit the casing parts to be revolved, one relative to the other, and to permit securing of the several branches of the casing at various angles in relation to each other.

The invention will be best understood by reference to the accompanying drawing in which:

Figure 1 is a perspective view of water softening apparatus in assembled relation to a pair of my improved control valves, a portion of the softener tank wall being broken away to show one of the interior distributor pipes;

Fig. 2 is a central longitudinal section through one of my improved valves, and

Fig. 3 is a cross section taken approximately on the line 3—3 of Fig. 2.

The casing of my valve comprises members indicated generally by the numerals 5 and 6 connected together by a union nut 7 having threads within opposite end portions of relatively opposite pitch or hand engaging the parts 5 and 6 respectively. For example, the threads 8 connecting the nut 7 to the member 5 may be right hand threads and the threads 9 connecting the nut to the member 6 may be left hand threads. This union connection permits the members 5 and 6 to be revolved, one relative to the other, and then drawn together to form a tight joint, with the port openings in any desired angular positions one relative to the others.

A chamber 10 is formed in the part 6 and annular valve seats 11 and 12 are formed at opposite ends of this chamber on the respective casing members 5 and 6. In continuous communication with the chamber 10 is a branch 13 of the member 6 defining a port passage which for convenience may be referred to as the central port passage. There is also a branch port passage 14 formed in the member 6 to communicate with the chamber 10 when the valve is open at its seat 12. Extending from the opposite end of the chamber 10 and formed in the casing member 5 is a passage 15 which is in continuous communication with a port defined by a branch 16 of the casing. A movable closure member 17 is mounted on an end of a valve stem 18 which extends through the passage 15 to the exterior of the casing where a handle 19 is fixed on the stem. Threads 20 on the stem 18 fit a threaded bore in a closure nut 21 and the latter is provided with a packing gland 22 of conventional construction affording a sealing connection between the stem and casing. Formed on the stem 18 near the closure member 17 is a series of radially projecting lugs 23 which slidably and revolubly engage the bore of the casing member 5 to guide the stem and permit the passage of liquid along it in the passage 15. The closure member 17 has suitable gaskets for engagement with the seats 11 and 12 respectively and is movable in the chamber 10 to close against either of these seats.

It will be evident that by manipulating the handle 19 the stem 18 may be turned to actuate the closure member 17 to either open or closed positions with respect to the seats 11 and 12. When the member 17 is closed against its seat 12, as shown in Fig. 2, the port passage 13 is in communication with the passage 15 and branch 16 and when moved to close at the seat 11 the passage through the branch 13 is in communication with the passage through branch 14. A threaded end portion 13a of the branch 13 is provided to fit a union nut 13b (Fig. 1) for joining the valve to a pipe or conduit.

Referring to Fig. 1, a pair of the valves hereinbefore described and indicated generally by the numerals 24 and 25 respectively are shown with suitable connections for controlling the flow of liquid to and from a water softening tank 26 during the water softening, regenerating and flushing cycles of operation. The tank 26 contains a body of water softening material 27 extending approximately to the elevation indicated by the broken line 28. Communicating with the top of the tank 26 is a filling neck 29 provided with a removable cover 30 and a clamp 31 for securing the cover in sealing relation to the filling neck and permitting removal of the cover 30 when a charge of regenerating material is to be placed in the tank.

The upper valve 24 has its branch 13 defining the central port connected to the tank 26 near its upper end and there is a slotted distributor pipe 32 extending within the tank in continuation of the branch 13. Hard water is supplied to the branches 14 of both valves 24 and 25 through a pipe 33 which is connected by a T-coupling 34 to the branch 14 of the upper valve and by a branch pipe 35 and elbow fitting extending to the branch 14 of the lower valve 25. Softened water is discharged through the branch 16 of the valve 24 and a pipe 36 connected thereto and liquid may be discharged to a waste or drain through the branch 16 of the valve 25. The branch 13 of the valve 25 is connected to the lower portion of the tank 26 and is in continuous communication with a slotted distributor pipe 37 extending within the tank.

It will be evident that the upper valve 24 has the casing branches 16 and 13 shown in relative positions corresponding to those shown in Fig. 2, whereas, the valve 25 has its branch 16 extending in the opposite direction or downward. In installing the valves and making the several pipe connections therewith it is only necessary to loosen the nut 7 to permit free rotation of the casing member 6 about the axis of the valve stem so that the branch 13 may be extended at any angle or in parallel relation to the branch 16. The union nut 13b engaging the threads 13a on branch 13 further facilitates installation by affording angular adjustment of the entire valve relative to one of its supporting conduits.

In the use of the water softener shown in Fig. 1, the closure member 17 of the valve 24 is closed against its seat 12 and the member 17 of the valve 25 is closed against its seat 11 during the normal water softening operation. This permits hard water from the pipe 33 to flow through the pipe 35 and to enter the bottom of the tank 26 through the branches 14 and 13 of the valve 25 and distributor pipe 37. In passing upward through the softening material 27, the water is softened and the soft water passes out through the distributor pipe 32 and through the branches 13 and 16 of the valve 24 to the pipe 36 and service outlets connected thereto.

Periodically, when it is necessary to regenerate the softening material 27, the valve 24 is retained in its closed position against the seat 12 and the valve 25 is closed at its seat 12 thus shutting off the supply of hard water to the tank and opening communication between the bottom of the tank and the drain outlet through the branch 16 of the valve 25. Now the cap 30 is opened, a predetermined charge of common salt or other regenerating material is placed in the tank and the cap 30 is closed. Upon opening the cap, air is admitted to the top of the tank and the water is allowed to flow from the bottom of the tank by gravity through branch 16 of valve 25 in sufficient quantity to admit the regenerating material. With the charge of regenerating material in the tank and the cap 30 closed, regeneration is initiated by reversing the position of the upper valve 24, thus allowing water to enter the top of the tank from pipe 33 through the T fitting 34, branches 14 and 13 of the valve 24 and distributor pipe 32 and to flow from the bottom of the tank through the branches 13 and 16 of the valve 25. The water thus admitted dissolves the regenerating material and carries it downward through the bed of softening material 27 from which it passes, together with the hardening salts removed from the bed, to the drain outlet. The valves are allowed to remain in the regenerating position for a predetermined period of time sufficient to cause regeneration and to flush out the hardening salts. At the end of this period the apparatus is returned to softening operation by closing the valve 24 at its seat 12 and valve 25 at seat 11.

My improved controls are of simple and durable construction and they can be manufactured, assembled and installed at low cost. They are so easy to understand and operate that they are particularly adapted for use in the control of domestic water softeners of the inexpensive type described.

Having described my invention, what I claim as new and desire to protect by Letters Patent is:

1. In water softening apparatus having a tank containing a body of water softening material and means for admitting regenerating material to said tank, the improvements which comprise, upper and lower two-way, three-port valves having ports communicating respectively with the upper and lower portions of said tank, said upper valve having a second port for discharging soft water and said lower valve having a second port constituting a drain outlet and means for supplying hard water to a third port of each of said valves, said valves being selectively operable to a first position to cause the flow of water to be softened through the softening material in said tank and through the second port of the upper valve and in another position to cause regenerating material and flushing water to flow through said softening material to the drain outlet port.

2. In water softening apparatus having a tank containing a body of water softening material and provided with a closure adapted to be opened manually to admit regenerating material to the upper portion of the tank, the improvements which comprise, upper and lower two-way, three-port valves having ports communicating respectively with the upper and lower portions of said tank, said upper valve having a second port for discharging soft water and said lower valve having a second port constituting a drain outlet, means for supplying hard water to the third port of each of said valves, and means for actuating said valves to a first position to cause the flow of water to be softened through the softening material in said tank and through the second port of the upper valve and to a reverse position to cause regenerating material and flushing water to flow through said softening material to the drain outlet, drainage of water by gravity from the tank being caused by positioning the upper valve in the first position and the lower valve in the reverse position when said manually operable closure is open.

LYNN G. LINDSAY.

REFERENCES CITED

The following references are of record in the file of this patent:

UNITED STATES PATENTS

| Number | Name | Date |
|---|---|---|
| 645,696 | Topp | Mar. 20, 1900 |
| 899,645 | Wright | Sept. 29, 1908 |
| 1,557,117 | Sweeney | Oct. 13, 1925 |
| 1,628,541 | Johnson | May 10, 1927 |
| 1,656,896 | Astrom | Jan. 24, 1928 |
| 2,043,668 | Kohler | June 9, 1936 |
| 2,082,623 | Gauss | June 1, 1937 |
| 2,260,523 | Henry | Oct. 28, 1941 |
| 2,329,350 | Kaysen | Sept. 14, 1943 |
| 2,347,201 | Lindsay | Apr. 25, 1944 |
| 2,432,178 | Shafer | Dec. 9, 1947 |

FOREIGN PATENTS

| Number | Country | Date |
|---|---|---|
| 212,453 | Great Britain | Mar. 13, 1924 |